(12) United States Patent
DeFant et al.

(10) Patent No.: US 11,629,010 B1
(45) Date of Patent: Apr. 18, 2023

(54) ROLLER CONVEYOR SYSTEM GUARDS

(71) Applicant: Amazon Technologies, Inc., Seattle, WA (US)

(72) Inventors: Jon David DeFant, Seattle, WA (US); Jeread Sines, Fernandina Beach, FL (US); Joshua Scott Owens, Boise, ID (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/465,301

(22) Filed: Sep. 2, 2021

(51) Int. Cl.
*B65G 13/07* (2006.01)
*B65G 13/12* (2006.01)

(52) U.S. Cl.
CPC ............. *B65G 13/07* (2013.01); *B65G 13/12* (2013.01)

(58) Field of Classification Search
None
See application file for complete search history.

(56) References Cited

U.S. PATENT DOCUMENTS

| | | | | |
|---|---|---|---|---|
| 4,718,543 A * | 1/1988 | Leisner | ................. | B65G 17/24 |
| | | | | 198/779 |
| 7,882,944 B1 * | 2/2011 | Eubanks | ................ | B65G 13/07 |
| | | | | 198/860.3 |
| 8,196,736 B2 * | 6/2012 | Wagner | ............... | B65G 13/071 |
| | | | | 198/781.04 |
| 9,022,207 B2 * | 5/2015 | Tully | ................... | B65G 13/071 |
| | | | | 198/600 |
| 9,550,625 B2 * | 1/2017 | Specht | .................. | B65G 13/02 |
| 9,643,784 B2 * | 5/2017 | Guerra | ................... | B65G 13/07 |
| 9,694,987 B1 * | 7/2017 | Schroader | ............. | B65G 47/66 |
| 10,233,035 B2 * | 3/2019 | Pettinga | ................ | B65G 47/66 |
| 10,926,955 B1 * | 2/2021 | Malina | .................. | B65G 13/11 |

* cited by examiner

*Primary Examiner* — Kavel Singh
(74) *Attorney, Agent, or Firm* — Kilpatrick Townsend & Stockton LLP (57) ABSTRACT

A guard assembly can be positionable in an installed position between a first roller and a second roller of a roller conveyor system. The guard assembly can include a first frame having a first contour shaped for receiving at least a portion of the first roller. The guard assembly can further include a second frame having a second contour shaped for receiving at least a portion of the second roller. The guard assembly can also include a biaser between the first frame and the second frame so as to urge the first frame toward the first roller and the second frame toward the second roller in the installed position.

20 Claims, 6 Drawing Sheets

ROLLER CONVEYOR SYSTEM GUARDS

BACKGROUND

Many varieties of conveyor systems can be utilized to move packages or other items within a warehouse or other environment. Various conveyor systems can include rollers that may be separated by spaces that are sufficiently small to permit packages or other conveyed items to pass over without dropping in to the spaces. At the same time, the small size of the spaces may nevertheless be large enough to permit entry of other smaller objects, which may be desirable to avoid.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein relate to guards that can be installed among rollers in a roller conveyor system. The guards can include a first frame and a second frame that can be pushed apart from one another by a spring or other biaser. The ability of the frames to be pushed apart may allow the frames to be pushed toward the rollers. The frames may accordingly be positioned in contact or close proximity with the rollers, which may allow the frames to block access into areas adjacent the rollers that could otherwise provide an opportunity for drawing in of gloves, vests, or other objects that are smaller than the items to be conveyed by the rollers.

In a particular example, each frame may include an arcuate contour. The arcuate contour may match and receive at least a portion of the roller, for example. The arcuate contour may end in an angled or pointed tip. The tip may be shaped to fit into a particular space defined by other components. For example, the roller may be engaged with a band that transfers rotational motion to or from the roller. The tip of the frame may be shaped to occupy or block access to a substantially triangular area defined where the band approaches or departs from the roller. Blocking access to such an area adjacent the roller may reduce opportunity for drawing in of clothes or other objects, for example.

The guard may include other features to facilitate continued operation of the rollers notwithstanding the presence of the guard. For example, the guard may include wheels (e.g., along the arcuate contour) that may contact the roller and facilitate a rolling interface (e.g., which may provide a low friction interface that permits the roller to continue rolling without substantial hindrance from the guard). As another example, the guard may include channels in which a band can ride while transferring rotational motion between rollers. The channels may be shaped similarly to and/or be aligned with channels in the rollers for accommodating the band, for example. In some examples, the guards may include plates or other sliders along which the frames can slide to retain linear alignment of the frames in use.

Figure 1:
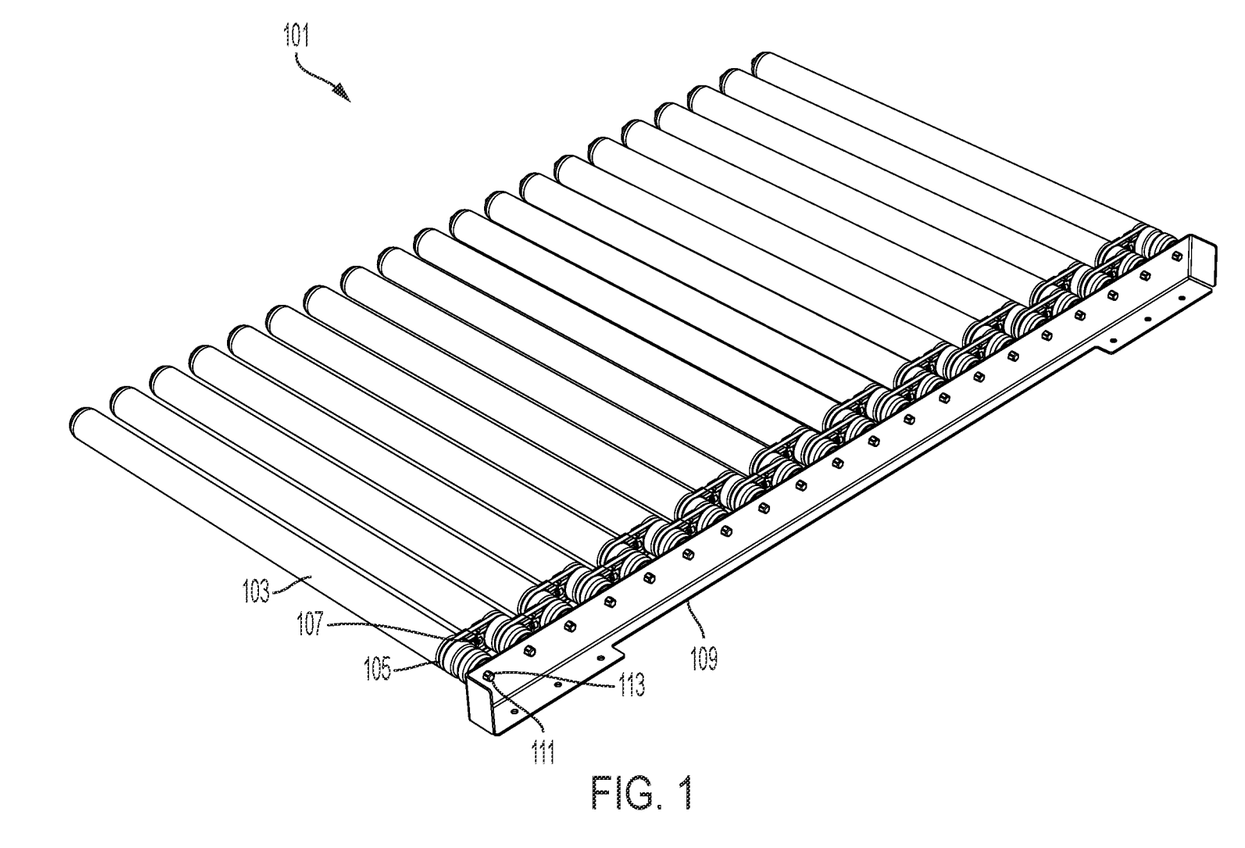
FIG. 1 is a perspective view of an example of a roller conveyor system that includes guards installed among rollers, in accordance with various embodiments.

Turning now to the figures, FIG. 1 is a perspective view showing elements of a roller conveyor system 101. The roller conveyor system 101 can include suitable components for advancing items in a warehouse or other environment. In FIG. 1, the system 101 is shown with rollers 103, bands 105, guards 107, and a support 109, although other combinations of fewer, more, or different elements may be utilized.

Figure 2:
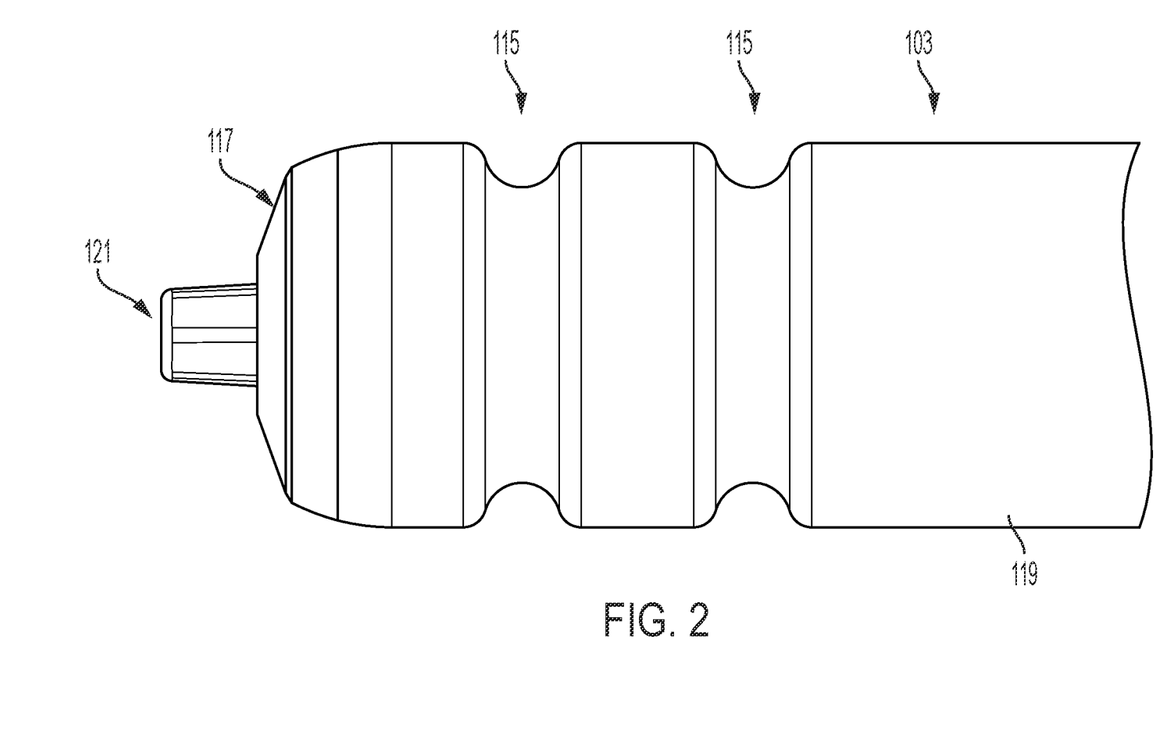
FIG. 2 is a side view of an example of a portion of a roller that may be utilized in the system of FIG. 1, in accordance with various embodiments.

The rollers 103 can be made of any suitable material, including metals, plastics, rubbers, or other durable materials that may withstand impact and/or that may be sufficiently formable to retain a suitable form factor for the function of the rollers 103. The rollers 103 may be cylindrical, for example, having a rounded or rolling face extending between opposite extremities. An example of an end of a roller 103 is shown in FIG. 2. Referring again to FIG. 1, the rollers 103 may be driven, for example, by one or more motors (not shown).

In various embodiments, the rollers 103 are coupled or engaged with one another via bands 105, which may be capable of transferring rotational motion between interconnected rollers 103 that are connected by the bands 105. For example, a motor or other driving device may cause a first roller 103 to rotate, which may in turn rotate a band 105 on the first roller 103, which may in turn cause rotation of a second roller 103 also engaged with the band 105, which may in turn transfer rotation through another band 105 to another roller, and so on.

The bands 105 can correspond to continuous loops. Non-limiting examples may include O-rings or loops forming round or elliptical shapes. In some examples, the bands 105 may have a flat cross-sectional shape, although rounded or any other suitable cross-sectional shape may be utilized. The bands 105 may be smooth or include teeth or other engagement features. Generally, the bands 105 can correspond to any form of belt or loop capable of engaging with the rollers 103 to transfer or convey rotational motion from one roller 103 to another roller 103. The bands 105 may be formed of rubber or other suitably resilient material that may be suitable for the function of the bands 105.

The rollers 103 can be supported and/or constrained by any suitable structure. In FIG. 1, the rollers 103 are engaged with the support 109. The support 109 may correspond to a rail or other structure. In the arrangement depicted in FIG. 1, the support includes apertures 111 to receive portions of the rollers 103. In embodiments, manipulandums 113 are provide to release one or more rollers from the support 113. The apertures 111 may provide interfaces through which or relative to which the manipulandums 113 may be operated to release respective rollers 103 relative to the support 109. For example, the manipulandum 113 may correspond to a button or a projection that may be capable of pushing or releasing the roller 103 from the support 109. The manipulandum 113 may correspond to an endmost portion of a roller 103, for example. Additionally or alternatively, the manipulandum 113 may correspond to a structure that engages the rollers 103 and/or supports the rollers 103 relative to the support 109.

Figure 3:
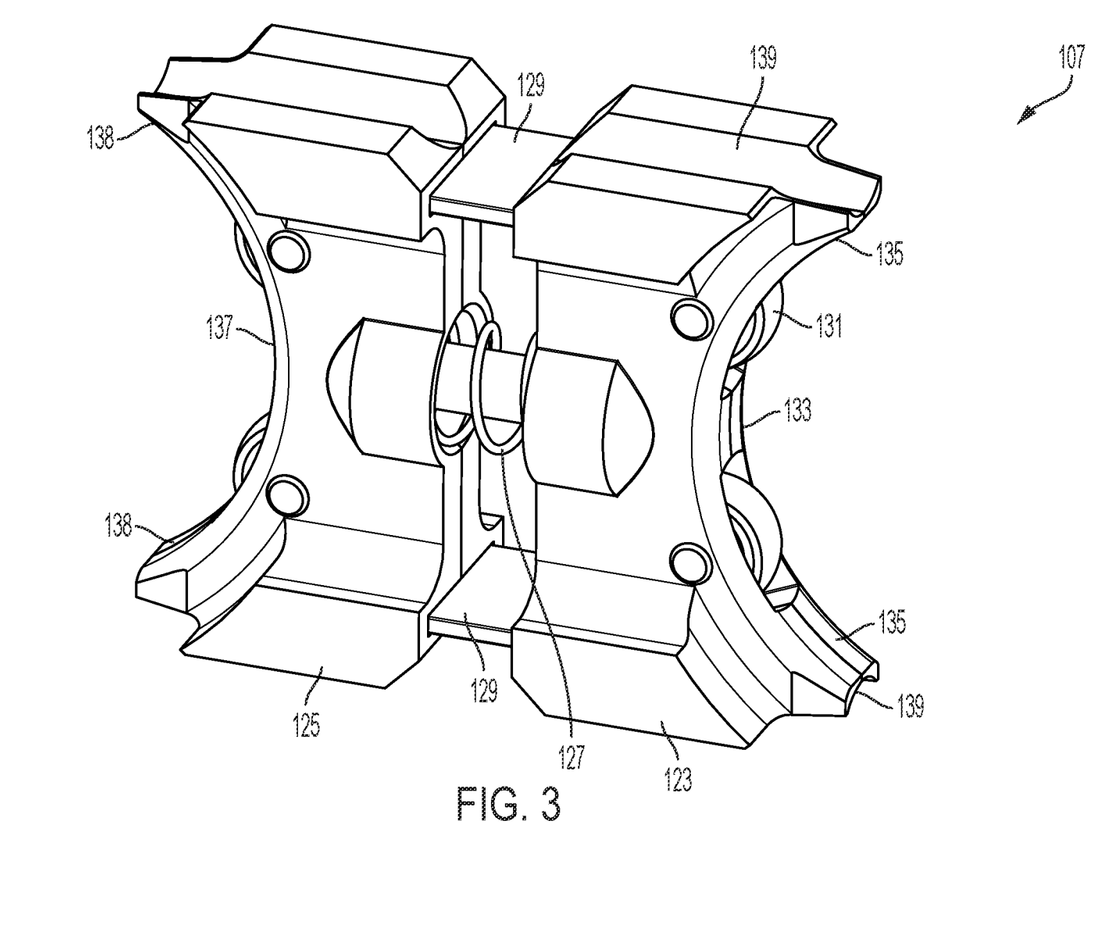
FIG. 3 is a perspective view of an example of a guard that may be utilized in the system of FIG. 1, in accordance with various embodiments.

The support 109 may correspond to a rail along which operators may be positioned for interacting with boxes, containers, or other items, that may be advanced by the roller conveyor system 101. For example, operators may add or remove items relative to the rollers 103. In use, the guards 107 may be implemented to reduce and/or eliminate a possibility of access into spaces that may be present between the rollers 103, for example. An example of a guard 107 is shown in FIG. 3.

Turning next to FIG. 2, FIG. 2 illustrates a side view of an example of a portion of a roller 103. The roller 103 can include suitable features for engaging with the bands 105. For example, in FIG. 2 the roller 103 includes a pair of grooves 115. The grooves 115 are shown as a smooth surface, but may include teeth or notches for geared mating with corresponding features on bands 105 (if present). The grooves 115 may additionally or alternatively include suitable radiuses, for example, to match profiles of bands 105 or other components or to otherwise suitably engage or provide engagement surfaces for engagement with the bands 105 or other components.

The grooves 115 in FIG. 2 include an endward groove 115 (e.g., at left in the view and proximate to an end 117 of the cylinder). The grooves 115 are also shown with a bodyward groove 115 (e.g., at right in the view and which may be proximal to a body 119 of the roller 103 that may extend away from the end 117). In use, provision of multiple grooves 115 may allow the roller 103 to receive multiple bands 105, e.g., which may permit the roller 103 to receive rotational motion via one band 105 and impart rotational motion via another band 105. For example, including multiple grooves 115 may allow the roller 103 to be coupled in series with multiple other rollers 103, for example, coupled with one behind to receive rotational motion and coupled with another in front to transfer that received rotational motion. In various examples, guards 107 may be positioned on either side of a given roller 103, e.g., a forward guard 107 to block a space extending toward a roller 103 ahead and a rearward guard 107 to block a space extending toward a roller 103 behind.

The end 117 in FIG. 2 is also shown with a shaft 121. The shaft 121 may provide a bearing surface on which the roller 103 can roll relative to the support 109. The shaft 121 may be an example of the manipulandum 113, for example.

FIG. 3 illustrates a perspective view of an example of a guard 107. The guard 107 may correspond to a guard assembly formed of respective subcomponents. In FIG. 3, the guard 107 is depicted with a first frame 123, a second frame 125, and a biaser 127 for urging the first frame 123 and the second frame 125 apart from one another. The guard 107 is also depicted with sliders 129 and wheels 131. Although specific numbers of particular components are shown, different numbers, combinations, and/or types of components may be utilized.

The first frame 123 can include a first contour 133 (e.g., at a forward end). The first contour 133 may be or have an arcuate shape, for example. The first contour 133 may be shaped to match, correspond to, and/or accommodate a profile of a corresponding roller 103 with which the first frame 123 is to engage in use. In use, the first contour 133 may receive a portion (e.g., a rounded portion) of a corresponding roller 103 therein. The roller 103 may be arranged and/or aligned concentrically with the first contour 133, for example.

The first frame 123 may include first tips 135. For example, in FIG. 3, the first tips 135 include an upper first tip and a lower first tip. The first tips 135 may be positioned along or at extremities of the first contour 133.

Similarly, the second frame 125 can include a second contour 137 (e.g., at a rearward end). The second contour 137 may be or have an arcuate shape, for example. The second contour 137 may be shaped to match, correspond to, and/or accommodate a profile of a corresponding roller 103 with which the second frame 125 is to engage in use. In use, the second contour 137 may receive a portion (e.g., a rounded portion) of a corresponding roller 103 therein. The roller 103 may be arranged and/or aligned concentrically with the second contour 137, for example.

The second frame 125 may include second tips 138. For example, in FIG. 3, the second tips 138 include an upper second tip and a lower second tip. The second tips 138 may be positioned along or at extremities of the second contour 137.

The biaser 127 is depicted as a coil spring but may correspond to any other type of spring and/or any other type of suitable biasing element. The biaser 127 can be positionable or configured for placement between the first frame 123 and the second frame 125. In use, the biaser 127 may urge the first frame 123 and second frame 125 apart from one another. Urging the first frame 123 and the second frame 125 apart from one another may urge the first frame 123 and the second frame 125 towards respective rollers 103, for example.

The wheels 131 may correspond to bearings or any other suitable rolling element or rolling-facilitating element. For example, the wheels 131 may correspond to suitable structures to permit rolling against the rollers 103 when in contact with the rollers 103.

The sliders 129 may correspond to plates or other structures relative to which the first frame 123 and/or the second frame 125 may slide. In various examples, the sliders 129 may constrain movement of the first frame 123 relative to the second frame 125. The sliders 129 may maintain spacing or linear alignment relative to or among the first frame 123 and the second frame 125, for example.

The guard 107 in FIG. 3 is also shown with a channel 139. The channel 139 may be shaped to accommodate the band 105 in use. The channel 139 may be formed in any suitable component of the guard 107. For example, the channel 139 is shown having portions in each of the top and bottom of each of the first frame 123 and the second frame 125. The channel 139 may further be formed in either or both of the sliders 129 in some examples. The slider 129 is shown as a flat component in FIG. 3 for simplicity of manufacture and assembly, although other shapes (such as including profiles of the channel 139) may be included additionally or alternatively. The channel 139 may be shaped and/or sized relative to the band 105 so that the band 105 is fully received interior to an open end of the channel 139 or the band 105 may extend at least partially out of an open end of the channel 139 in use.

Figure 4:
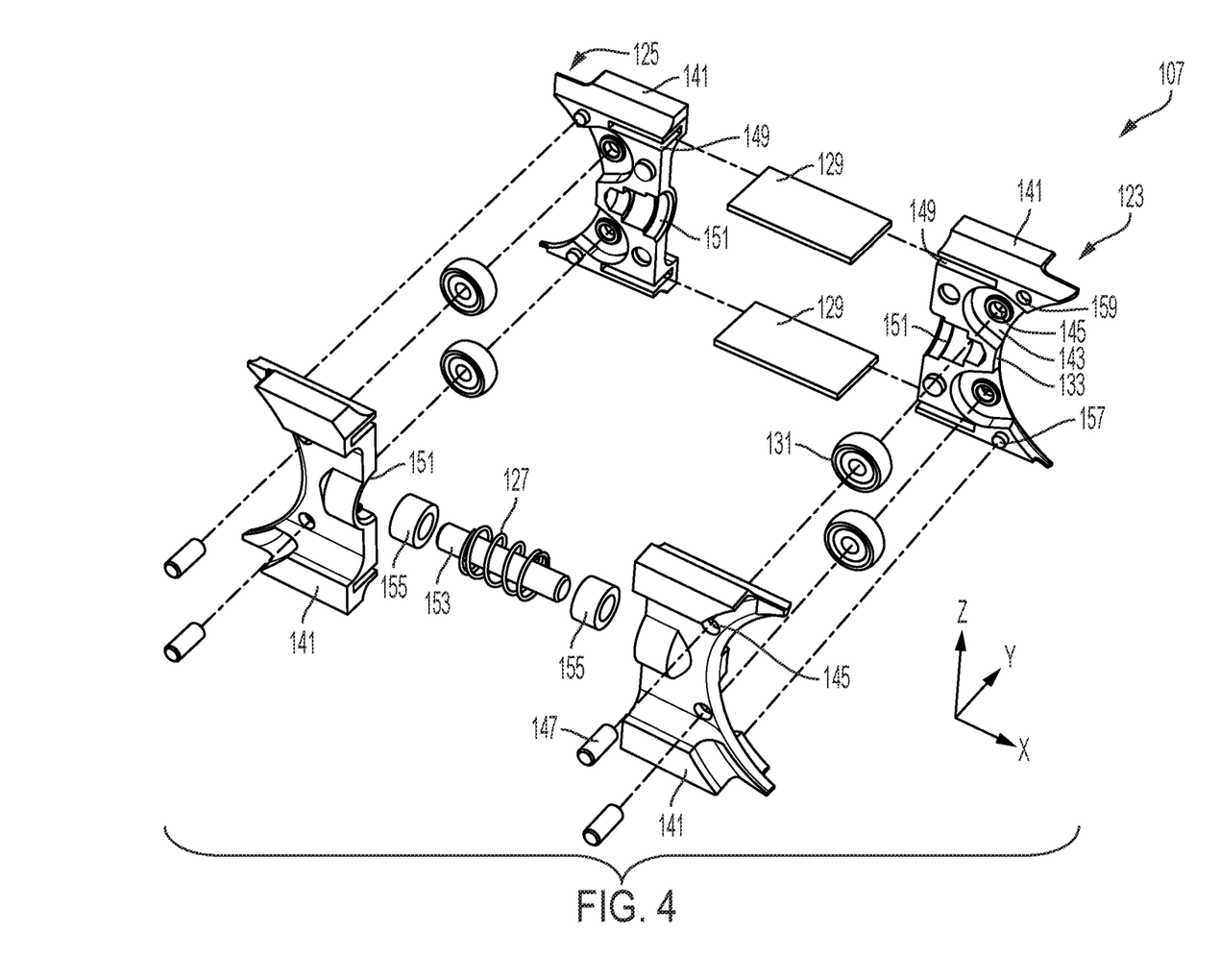
FIG. 4 is an exploded view of an example of components that may be utilized to form the guard of FIG. 3, in accordance with various embodiments.

FIG. 4 illustrates an exploded view of an example of components that may be utilized to form the guard 107. Components of the guard 107 of any suitable material, including metals, rubbers, plastics, or other durable materials that may withstand impact and/or that may be sufficiently formable to retain a suitable form factor for the function of the guard 107 and/or otherwise suitable for the function of the guards 107. In FIG. 4, each of the first frame 123 and the second frame 125 are formed with use of a repeated part 141. For example, the part 141 may correspond to a component that is fabricated in multiples using the same mold or model for fabrication, e.g., such that different instances of the part 141 are replicas of each other.

The part 141 can be rotated, flipped, and/or otherwise reoriented to provide a suitable subcomponent of the guard 107. For example, in FIG. 4, the first frame 123 is formed of a first pair of the part 141, and a second pair of the part 141 is used to form the second frame 125. For ease of reference, a set of axes X, Y, and Z are shown in FIG. 4 (e.g., with X corresponding to a direction along which the first frame 123 and the second frame 125 are moveable toward or away from one another in use, with Y corresponding to a direction along which pairs of the part 141 can be coupled to form the first frame 123 and/or the second frame 125, and with Z corresponding to a generally vertical direction). With respect to different orientations shown in FIG. 4, one orientation of the part 141 is shown at the upper right of FIG. 4, while the upper left in FIG. 4 shows another orientation of the part 141 (e.g., rotated 180 degrees clockwise or counterclockwise, such as about the Y axis). In addition, starting from the orientations shown in the upper right and left in FIG. 4, the parts 141 can be flipped (e.g., forward or out of the page or about the X axis) to arrive at the additional orientations depicted at bottom right and left in FIG. 4. As a further example, the orientation shown in the lower left additionally or alternatively may be reached by rotating 180 degrees about the Z axis from the orientation shown in the upper right.

The part 141 can include suitable features for interfacing with other elements or components of the guard 107. The part 141 can have indentations 143 that may serve or function as a seat for the wheels 131. The seat or indentation 143 may position the wheel 131 to extend at least partially past the first contour 133 or other edge of the part 141. For example, this may correspond to a position for the wheel 131 to be able to engage the roller 103 in use.

The part 141 may further include through holes 145. For example, the through holes 145 may correspond to central passages suitable for aligning with central passages of the wheel 131. For example, pins 147 may be utilized and inserted through the through holes 145 and wheels 131 in use to secure the wheels 131 relative to the part 141 and/or to otherwise secure the wheels 131 relative to the guard 107.

The part 141 can also include slots 149 in which the sliders 129 can be received. The slots 149 may be sized to allow travel of the sliders 129 in use and permit the guard 107 to expand or contract in size in operation. The slots 149 may constrain travel of the sliders 129 to maintain linear alignment of the first frame 123 with the second frame 125 in use.

In addition, the part 141 may include recesses 151 that may be suitably shaped and sized to receive elements of the biaser 127 and/or related components. For example, in FIG. 4, the recesses 151 may form a housing for elements included in or associated with the biaser 127. In FIG. 4, the biaser 127 is shown as a spring that also includes and/or is accompanied by a rod 153 and bushings 155. The rod 153 may provide a guide for alignment of the spring and/or the bushings 155. The bushings 155 may provide an interface for suitably securing elements associated with the biaser 127 relative to the recesses 151, for example, to permit some degree of lengthwise movement in the recesses 151 to permit the guard 107 to expand or contract in size in operation.

The part 141 can include suitable features for indexing and/or engaging with other instances of the part 141. For example, in FIG. 4, the part 141 is shown with a boss 157 and a depression 159. The boss 157 and the depression 159 may be arranged on the part 141 such that the boss 157 of one instance of the part 141 will engage and be received in the depression 159 in a corresponding oppositely situated instance of the part 141.

Figure 5:
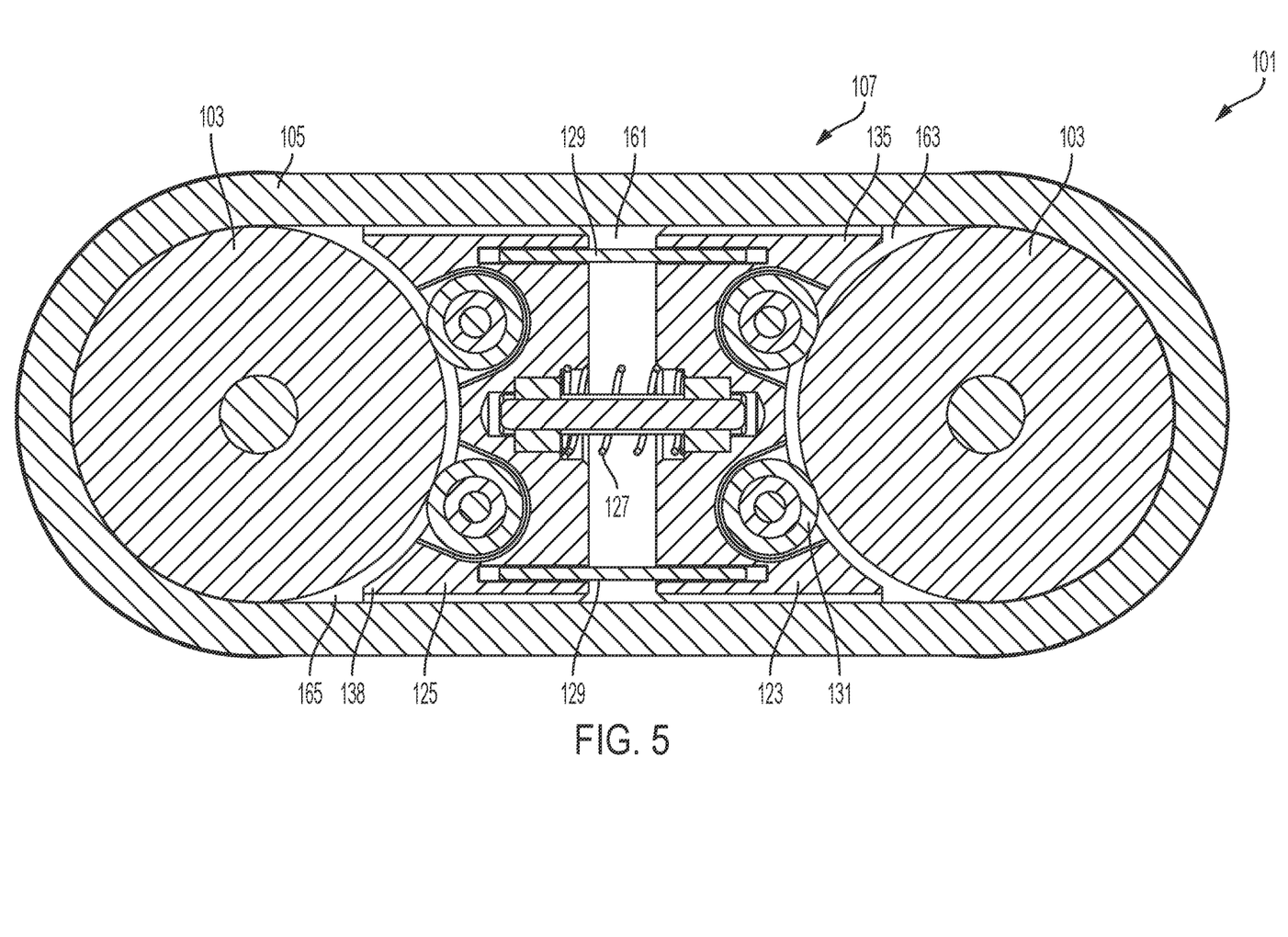
FIG. 5 illustrates an example of the guard of FIG. 3 installed relative to a set of rollers and a band that may be utilized in the system of FIG. 1, in accordance with various embodiments.

FIG. 5 illustrates an example of the guard 107 installed relative to a set of rollers 103 and a band 105. For example, the roller 103 to the right in FIG. 5 may correspond to a forward roller while the roller 103 to the left in FIG. 5 may correspond to a rearward roller spaced rearwardly from the forward roller. However, other relative arrangements of rollers may be utilized. The band 105 may be received about the rollers 103, for example, within the grooves 115 (FIG. 2).

As may be best seen in FIG. 5, a bounded space 161 may be defined by other elements of the system 101. For example, the bounded space 161 may include upper and lower boundaries defined by the band 105 and forward and rearward boundaries defined by the forward and rearward rollers 103. The guard 107 and/or portions thereof may be sized and particularly suited for operation within the bounded space 161. For example, the guard 107 may be sized so that once installed, the guard 107 is arranged between upper and lower portions of the band 105 and/or so that the band 105 may ride in the channel 139 (FIG. 3). The guard 107 may be considered to fit within the bounded space 161, notwithstanding that some portions of the guard 107 may extend beyond, such as portions of the channel 139 that may extend past extremities of the upper and lower portions of the band 105 so that the band 105 can ride in the channel 105 in use.

Referring further to FIG. 5, the guard 107 may be positioned within the bounded space 161. For example, the biaser 127 may be temporarily compressed to allow the first frame 123 and the second frame 125 to be moved toward one another to fit within the bounded space 161. Within the bounded space 161, the biaser 127 may push the first frame 123 and the second frame 125 apart from one another. The first frame 123 may be positioned to engage a forward or first roller 103 (e.g., at right in FIG. 5), while the second frame 125 may be positioned to engage a second or rear roller 103 (e.g., at left in FIG. 5). Engagement may include the wheels 131 coming into contact with the rollers 103. For example, the wheels 131 may ride in the grooves 115 (e.g., FIG. 2) of the rollers 103, and/or other elements of the guard 107 may be sized to fit within the grooves 115 additionally or alternatively. In some examples, the first tip 135, the second tip 138, and/or other structure of the guard 107 may be positioned to extend at least partially into the grooves 115 without contacting side and/or bottom surfaces of the grooves 115.

In use, the first frame 123 and the second frame 125 may be moveable toward or away from each other. For example, the first frame 123 and the second frame 125 may slide relative to sliders 129. As a further example, the biaser 127 may allow compression and expansion that allow the relative movement of the first frame 123 and the second frame 125 toward or away from one another. Compression and expansion of the guard (e.g., via the biaser 127, sliders 129, and/or other structure) may be useful for resizing to facilitate installation and/or removal of the guard 107 relative to the bounded space 161 and/or other spaces between rollers 103, for example. Additionally or alternatively, compression and expansion of the guard 107 may account (e.g., dynamically) for variations in distance between the rollers 103 that may occur due to design variations (e.g., which may correspond to differences in pitch or spacing between rollers, or differences in sizes of rollers utilized). The ability of the guard 107 to dynamically and/or automatically adjust in size additionally or alternatively may accommodate variations that may occur due to wear in use (such as out of-roundness of rollers 103 or creep in positioning of rollers 103 relative to one another).

In use, the positioning of the guard 107 may cause the first tip 135 to be positioned adjacent an interface of the band 105 and the first roller 103. For example, the first tip 135 may obstruct or block access from a lateral side into a first nip zone 163 that may be defined or located along an interface of the band 105 and the forward or first roller 103 shown at right in FIG. 5. Similarly, the second tip 138 of the second frame 125 may be positioned to obstruct or block access from a lateral side into a second nip zone 165 defined along an interface between the band 105 and the second or rearward roller 103 shown at left in FIG. 5. The first tip 135 and/or the second tip 138 may be positioned so as to be out of contact from the associated roller 103 (e.g., which may avoid additional friction that could slow or impede turning of the roller 103). Although the first nip zone 163 and the second nip zone 165 are shown at top right and bottom left in FIG. 5 corresponding to a clockwise movement of the band 105, the nip zones could be positioned on the opposite sides of the rollers 103, for example, if the band 105 were operated in the opposite direction. Although a highest possibility for intrusion may be along nip zones defined where a band 105 is advancing toward a roller 103 instead of away, the guard 107 may obstruct or block access into any relevant area, regardless of whether adjacent to a roller 103 where a band 105 is moving toward or away from the roller 103.

Figure 6:
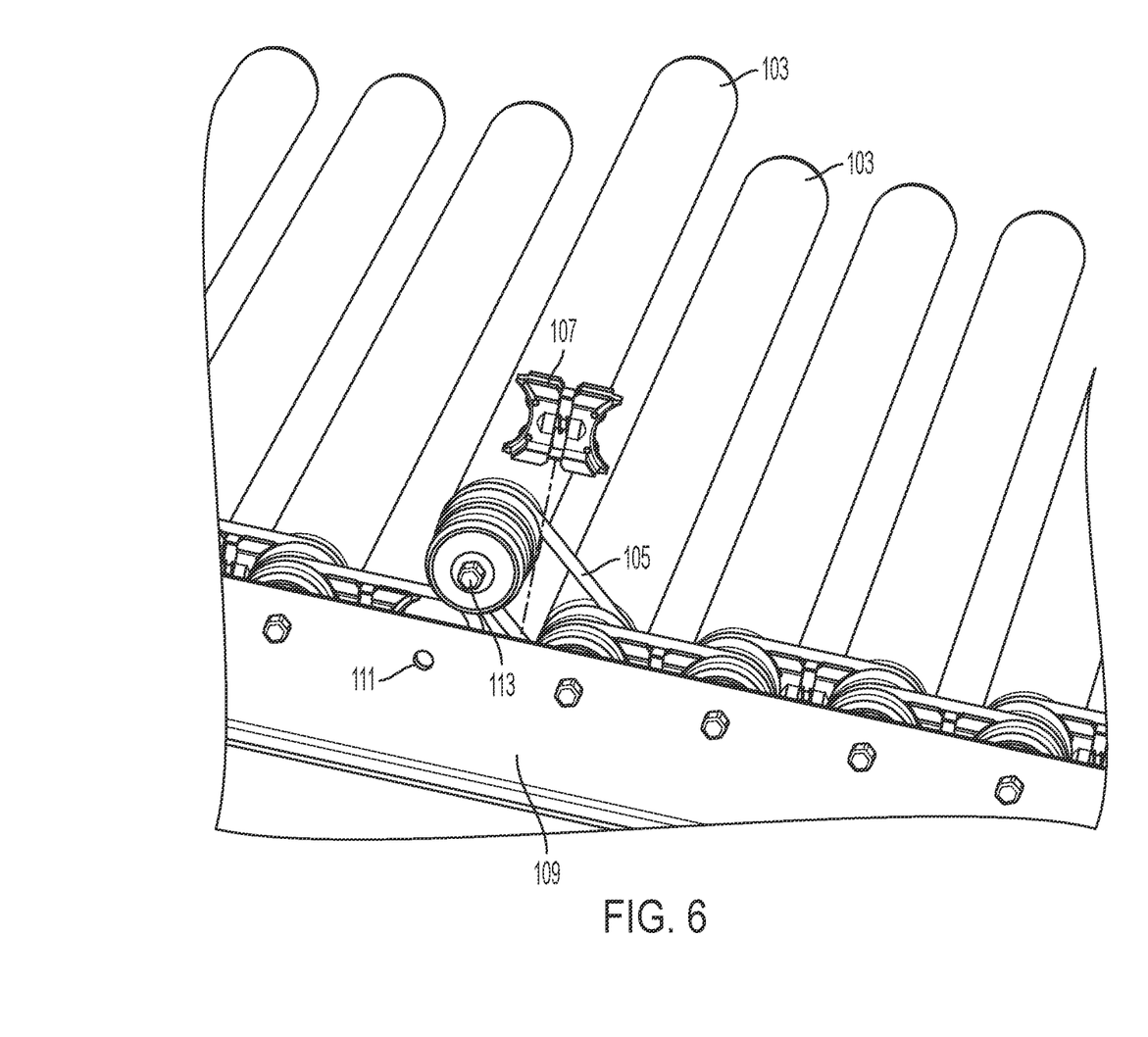
FIG. 6 illustrates an example of the guard of FIG. 3 in a position ready for installation between rollers that may be utilized in the system of FIG. 1.

FIG. 6 illustrates an example of a guard 107 in a position ready for installation between rollers 103. For example, one roller 103 in FIG. 6 is shown removed from and above the support 109 with the manipulandum 113 removed from the aperture 111. With the roller 103 decoupled from the support 109, the band 105 may remain in contact with the roller 103 or may be removed to facilitate installation. The guard 107 may be inserted between rollers 103 with one or more of the rollers 103 separated from the support 109, and/or with rollers 103 engaged in the support 109. For installation, the guard 107 may be compressed along the biaser 127, for example. The roller 103 may be reengaged with the support 109 after installation of the guard 107 in some examples.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A roller conveyor system, comprising:
   a forward roller;
   a rearward roller spaced rearwardly from the forward roller along a longitudinal direction;
   a continuous band defining a loop in which the forward roller and the rearward roller are positioned, the continuous band engaged with the forward roller and the rearward roller for transfer of rotational movement between the rearward roller and the forward roller;
   a bounded space having upper and lower boundaries defined by the continuous band, the bounded space further having forward and rearward boundaries defined by the forward roller and the rearward roller;
   a guard assembly positioned within the bounded space and comprising:

a forward frame having a forward end with a forward arcuate contour receiving a rounded portion of the forward roller therein;

a rearward frame having a rearward end with a rearward arcuate contour receiving a rounded portion of the rearward roller therein;

a spring in between the forward frame and the rearward frame and arranged to push the forward frame and the rearward frame apart along the longitudinal direction such that:

the forward frame is pushed into engagement with the forward roller such that a forward tip of the forward frame is arranged for blocking access from a lateral side of the bounded space into a forward nip zone defined along an interface of the forward roller with the continuous band; and the rearward frame is pushed into engagement with the rearward roller such that a rearward tip of the rearward frame is arranged for blocking access from the lateral side of the bounded space into a rearward nip zone defined along an interface of the rearward roller with the continuous band.

2. The roller conveyor system of claim 1, wherein the guard assembly further comprises:

forward wheels extending from the forward arcuate contour and into rolling contact with the forward roller; and rearward wheels extending from the rearward arcuate contour and into rolling contact with the rearward roller.

3. The roller conveyor system of claim 2, wherein the forward tip is arranged out of contact with the forward roller, and wherein the rearward tip is arranged out of contact with the rearward roller.

4. The roller conveyor system of claim 3, wherein the forward roller and the rearward roller each include grooves shaped for receiving at least the continuous band, wherein the forward wheels and rearward wheels contact bottom surfaces of the grooves, and wherein the forward tip and the rearward tip extend into the grooves and are out of contact with the bottom surfaces of the grooves.

5. A roller conveyor system, comprising:
a first roller;
a second roller arrangeable rearwardly from the first roller along a longitudinal direction;
a band sized for positioning in engagement with the first roller and the second roller for transfer of rotational motion therebetween;
a guard assembly sized for positioning between the first roller, the second roller, and upper and lower portions of the band, the guard assembly comprising:
a first frame having a first contour shaped for receiving at least a portion of the first roller;
a second frame having a second contour shaped for receiving at least a portion of the second roller; and
a biaser positionable longitudinally between the first frame and the second frame so as to urge the first frame toward the first roller and the second frame toward the second roller.

6. The roller conveyor system of claim 5, further comprising:
a first tip defined by the first frame, wherein the biaser is configured to urge the first tip into a first position obstructing access into a first nip zone defined adjacent the first roller and the band.

7. The roller conveyor system of claim 6, further comprising:

a second tip defined by the second frame, wherein the biaser is configured to urge the second tip into a second position obstructing access into a second nip zone defined adjacent the second roller and the band.

8. The roller conveyor system of claim 5, wherein at least one of the first roller or the second roller includes a groove sized to receive at least a portion of the band.

9. The roller conveyor system of claim 5, wherein at least one of the first frame or the second frame includes a channel sized to receive at least a portion of the band.

10. The roller conveyor system of claim 5, further comprising a first wheel positionable in the first frame for extending into contact with the first roller.

11. The roller conveyor system of claim 10, further comprising a second wheel positionable in the second frame for extending into contact with the second roller.

12. The roller conveyor system of claim 5, wherein the first contour comprises a first arcuate shape configured for concentric alignment with the first roller, and wherein the second contour comprises a second arcuate shape configured for concentric alignment with the second roller.

13. The roller conveyor system of claim 5, wherein the first roller comprises a forward roller;
wherein the second roller comprises a rearward roller spaced rearwardly from the forward roller;
wherein the band comprises a continuous band defining a loop in which the forward roller and the rearward roller are positioned, the continuous band engaged with the forward roller and the rearward roller for transfer of rotational movement between the rearward roller and the forward roller;
wherein the roller conveyor system further comprises a bounded space having upper and lower boundaries defined by the continuous band, the bounded space further having forward and rearward boundaries defined by the forward roller and the rearward roller;
wherein the guard assembly is positioned within the bounded space and comprises:
a forward frame comprising the first frame and having a forward end with a forward arcuate contour receiving a portion of the forward roller therein;
a rearward frame comprising the second frame and having a rearward end with a rearward arcuate contour receiving a portion of the rearward roller therein;
a spring comprised by the biaser, positioned in between the forward frame and the rearward frame, and arranged to push the forward frame and the rearward frame apart such that:
the forward frame is pushed into engagement with the forward roller such that a forward tip of the forward frame is arranged for blocking access from a lateral side of the bounded space into a forward nip zone defined along an interface of the forward roller with the continuous band; and
the rearward frame is pushed into engagement with the rearward roller such that a rearward tip of the rearward frame is arranged for blocking access from the lateral side of the bounded space into a rearward nip zone defined along an interface of the rearward roller with the continuous band.

14. A guard assembly positionable in an installed position between a first roller and a second roller of a roller conveyor system that are spaced apart from one another along a longitudinal direction, the guard assembly comprising:

a first frame having a first contour shaped for receiving at least a portion of the first roller of the roller conveyor system;

a second frame having a second contour shaped for receiving at least a portion of the second roller of the roller conveyor system; and a biaser positionable longitudinally between the first frame and the second frame so as to urge the first frame toward the first roller and the second frame toward the second roller in the installed position.

15. The guard assembly of claim 14, wherein the first frame and the second frame each include a channel sized for receiving a band operable to transfer rotational motion between the first roller and the second roller.

16. The guard assembly of claim 14, further comprising at least one slider along which the first frame and the second frame are slidable for maintaining a linear alignment between the first frame and the second frame.

17. The guard assembly of claim 16, wherein the first frame and the second frame each include a slot in which the slider is positioned.

18. The guard assembly of claim 14, wherein the first frame is formed by a first part in a first orientation coupled with a second part that is a replica of the first part and in a second orientation, and wherein the second frame is formed by a third part that is a replica of the first part, in a third orientation, and coupled with a fourth part that is a replica of the first part and in a fourth orientation.

19. The guard assembly of claim 14, further comprising:
a first wheel extending from the first contour; and
a second wheel extending from the second contour.

20. The guard assembly of claim 14, further comprising components to form a system that comprises the roller conveyor system, wherein the roller conveyor system comprises:
a forward roller comprising the first roller;

a rearward roller comprising the second roller and spaced rearwardly from the forward roller;

a continuous band defining a loop in which the forward roller and the rearward roller are positioned, the continuous band engaged with the forward roller and the rearward roller for transfer of rotational movement between the rearward roller and the forward roller;

a bounded space having upper and lower boundaries defined by the continuous band, the bounded space further having forward and rearward boundaries defined by the forward roller and the rearward roller;

wherein the guard assembly is positioned within the bounded space and comprises:

a forward frame comprising the first frame and having a forward end with a forward arcuate contour receiving a portion of the forward roller therein;

a rearward frame comprising the second frame and having a rearward end with a rearward arcuate contour receiving a portion of the rearward roller therein; and a spring comprised by the biaser, positioned in between the forward frame and the rearward frame, and arranged to push the forward frame and the rearward frame apart such that:

the forward frame is pushed into engagement with the forward roller such that a forward tip of the forward frame is arranged for blocking access from a lateral side of the bounded space into a forward nip zone defined along an interface of the forward roller with the continuous band; and the rearward frame is pushed into engagement with the rearward roller such that a rearward tip of the rearward frame is arranged for blocking access from the lateral side of the bounded space into a rearward nip zone defined along an interface of the rearward roller with the continuous band.

* * * * *